United States Patent
Rostron et al.

[19]

[11] Patent Number: 5,963,021
[45] Date of Patent: Oct. 5, 1999

[54] DELAYED CONTACT CLOSING APPARATUS AND METHOD FOR CAPACITORS

[75] Inventors: Joseph P. Rostron, Brandon, Miss.; Lee E. Berkebile, Pittsburgh, Pa.

[73] Assignee: Siemens Power Transmission & Distribution, LLC, Wendell, N.C.

[21] Appl. No.: 09/075,481

[22] Filed: May 11, 1998

[51] Int. Cl.⁶ .................................................. G05F 1/70
[52] U.S. Cl. ............................................................ 323/210
[58] Field of Search .................................... 323/205, 207, 323/210, 211, 209; 361/8, 9, 13

[56] References Cited

U.S. PATENT DOCUMENTS

| | | | |
|---|---|---|---|
| 4,245,185 | 1/1981 | Mitchell et al. | 323/235 |
| 4,555,658 | 11/1985 | Hausler et al. | 323/210 |
| 4,567,424 | 1/1986 | Dobsa et al. | 323/210 |
| 4,677,364 | 6/1987 | Williams et al. | 322/47 |
| 4,700,123 | 10/1987 | Beling | 323/210 |
| 4,752,726 | 6/1988 | Aoyama | 323/207 |
| 4,780,622 | 10/1988 | Woodford et al. | 307/134 |
| 4,859,925 | 8/1989 | Beling | 323/210 |
| 4,922,363 | 5/1990 | Long et al. | 361/3 |
| 5,293,110 | 3/1994 | Andrei | 323/209 |
| 5,361,184 | 11/1994 | El-Sharkawi et al. | 361/93 |
| 5,548,203 | 8/1996 | Kemerer et al. | 323/210 |
| 5,644,463 | 7/1997 | El-Sharkawi et al. | 361/94 |
| 5,670,864 | 9/1997 | Marx et al. | 323/211 |
| 5,684,389 | 11/1997 | Tyll et al. | 323/209 |

*Primary Examiner*—Adolf Deneke Berhane

[57] ABSTRACT

A transient reducing capacitor switching device that switches grounded capacitors into a multi-phase power line, wherein each phase of the line carries an AC voltage signal that cycles its polarity. A first switch is associated with a first grounded capacitor, a second switch is associated with a second grounded capacitor and a third switch is associated with a third grounded capacitor. A switch controller switches the first capacitor into the first phase of the power line substantially when the voltage signal in the first phase crosses zero potential. The switch controller has a delay that delays at least one-quarter of one cycle after the first capacitor was switched into the first phase, then switches the second capacitor into the second phase of the line substantially when the voltage signal in the second phase crosses zero potential. The switch controller then delays at least another one-quarter of one cycle after the second capacitor was switched into the second phase, then switches the third capacitor into the third phase of the line substantially when the voltage signal in the third phase crosses zero potential.

27 Claims, 4 Drawing Sheets

DELAYED CONTACT CLOSING APPARATUS AND METHOD FOR CAPACITORS

FIELD OF INVENTION

This invention relates generally to devices for switching grounded capacitors into high voltage distribution systems, and, more particularly, to a device and method for decreasing voltage transients associated with switching grounded capacitors.

BACKGROUND OF INVENTION

In a typical power distribution system, power is distributed over power transmission lines between a power generator and a load. The efficiency of such a distribution system improves when it is operated near unity power factor. The transmission of power, however, almost inevitably involves current induced magnetic fields, which leads to a lagging power factor of the distribution system. In addition, since loads vary at different times of the day, week and seasons, this power factor is constantly changing.

In order to improve the efficiency of the distribution system, the power factor is often corrected by introducing a source of leading power factor to the system, such as capacitance. Consequently, capacitors are usually shunt-connected across the power transmission lines and can be either energized continuously or switched on and off during changing load cycles. Moreover, capacitors can either be grounded or ungrounded. In most cases, capacitors are automatically discharged when switched out of the system.

Switching of capacitors into a power system, however, may cause voltage transients, especially when capacitors are switched into high voltage systems. For example, in the case of a grounded capacitor, one side of the capacitor is usually connected to a substation ground grid. Switching such a capacitor into a distribution system may cause the current inrush through the capacitor since it may be at a different potential than the power line it is being connected to. This causes voltage transients in the ground grid of the substation, as well as voltage transients in the power line that degrade the quality of the power supplied to the customer. These current transients may also blow the protective fuses which are connected in series with the capacitor, decrease the lifespan of the capacitor, damage substation control circuitry, and cause interference with nearby electrical controls.

In cases of multiple phase transmission systems, these problems are multiplied. For example, in a three phase transmission system, three capacitors may have to be switched into the system, and, as each capacitor is switched into the system, it may cause transients. Accordingly, multiple phase distribution systems present additional complexities when switching capacitors into the system.

It is known that to decrease these transients, each grounded capacitor should be switched into its respective line when the voltage on that line crosses zero potential. This way, the capacitor and the line are at the same potential. This decreases current surges and hence decreases voltage transients.

More particularly, for a typical three-phase transmission system, each phase is transmitted 120 degrees apart. This produces voltage zero crosses that are 60 degrees apart. Thus, to switch three grounded capacitors into this system, the first capacitor for the first phase is switched in when the voltage signal carried in the first phase crosses zero potential, followed by the second capacitor for the second phase being switched in 60 degrees later, followed by the third capacitor being switched in 60 degrees after the second.

In practice, however, it is difficult to switch a capacitor into a line exactly when the voltage signal in the line crosses zero potential. This is primarily due to arcing between the contacts of the capacitor switch as it closes, which is commonly referred to as pre-striking. Pre-striking causes current to flow between the contacts of the capacitor switch before they actually close, which means that the capacitor may be inserted into the line before the voltage signal in the line actually crosses zero potential.

To address this problem, it is known to close the capacitor switch shortly after the voltage signal crosses zero potential. This provides a window of time during which the switch can pre-strike. If pre-striking occurs as the contacts move towards each other, it will occur closer to when the voltage signal crosses zero potential. This will decrease the magnitude of any associated voltage transients.

In fact, to address the pre-striking problem, many manufacturers intentionally design their systems such that the capacitor switches close about 1 millisecond after their respective voltage signal crosses zero potential. Thus for a typical 60 hertz system, at 1 millisecond after the zero voltage zero, the voltage signal is 19% of its peak voltage. The capacitor switch is then designed to withstand this voltage, since, in some instances, the switch may not pre-strike and therefore close at 19% of peak voltage. In addition, in situations where the switch pre-strikes, it is unlikely that the switch will pre-strike more than 1 millisecond prior to zero crossing due to the distance between the switch's contacts at that time. Closing the contacts after voltage zero also allows for minor variations in the closing times due to the mechanical nature of the switches.

However, having the capacitor switch close after zero crossing does not completely solve the transient and pre-striking problem. Additional problems arise because the ground grid to which a capacitor is grounded has inductance. Thus, as the capacitor switch closes and pre-strikes, the current that begins to flow through the capacitor and switch can be at very high frequency, for example, around 10,000 hertz. Although this current may not be of a very high magnitude, it can cause a large voltage rise in the ground grid due to the grid's inductance and the high frequency. This, in turn, causes a large voltage rise across the contacts of the remaining open capacitor switches, which makes it more likely that those switches will pre-strike, which, in turn, compounds the voltage transient problem. In other words, if the first switch pre-strikes, the next two switches are more likely to pre-strike, and may, in fact, pre-strike at the same time as the first switch. The pre-striking of these switches adds further transients and further increases the voltage rise across the ground grid. Thus, voltage transients are compounded, which can adversely impact the quality of power being supplied to the customer, and can lead to equipment damage as described above.

Accordingly, it is desirable to provide an inexpensive and reliable switching device for grounded capacitors. Moreover, it is desirable to provide a capacitor switching device that accurately switches capacitors into a multiphase transmission system at an appropriate time relative to the voltage signal in the respective lines to decrease voltage transients and decrease the likelihood of pre-striking. In addition, it is also desirable to provide a switching device for capacitors that is easy to manufacture, install and maintain.

SUMMARY OF INVENTION

The preferred embodiment of the present invention uses a control device that monitors the voltage signal in a single phase of a multiple phase transmission system. The control device issues a control signal that releases a compression spring that closes a switch thereby switching-in an associated capacitor when the voltage signal in the monitored line is predicted to be at an appropriate potential.

After the first phase capacitor is switched in, a subsequent zero crossing is allowed to pass, and then a second phase capacitor is switched in to its respective phase. By delaying before the second phase capacitor is switched in, the transients associated with switching-in the first capacitor are allowed to dissipate, which significantly decreases the likelihood of pre-striking during the switching-in of the second and third phase capacitors, which decreases overall voltage transients.

After the second phase capacitor is switched in, a subsequent zero crossing is allowed to pass, and then a third phase capacitor is switched in to its respective phase. In other words, the first phase capacitor is switched in, a subsequent zero crossing is allowed to pass, the second phase capacitor is switched in, a subsequent zero crossing is allowed to pass, and then the third phase capacitor is switched in. Like the delay between the switching-in of the first phase and second phase capacitors, by delaying between the switching-in of the second and third phase capacitors, the transients associated with switching-in the second capacitor are allowed to dissipate, which significantly decreases the likelihood of pre-striking during the switching-in of the third phase capacitor, which further decreases overall voltage transients.

These delays between switchings are preferably implemented by mechanically staggering the distances between the contacts of each capacitor switch. The switches are then gang controlled by a single controller. Alternatively, these delays can be implemented by electrical or electronic controls where the capacitor switches are controlled by multiple mechanisms (e.g., one per phase).

BRIEF DESCRIPTION OF THE DRAWINGS

The accompanying drawings, which are incorporated in and constitute a part of the specification, illustrate a presently preferred embodiment of the invention, and, together with the general description given above and the detailed description of the preferred embodiment given below, serve to explain the principals of the invention.

DETAILED DESCRIPTION OF THE PREFERRED EMBODIMENT

Figure 1:
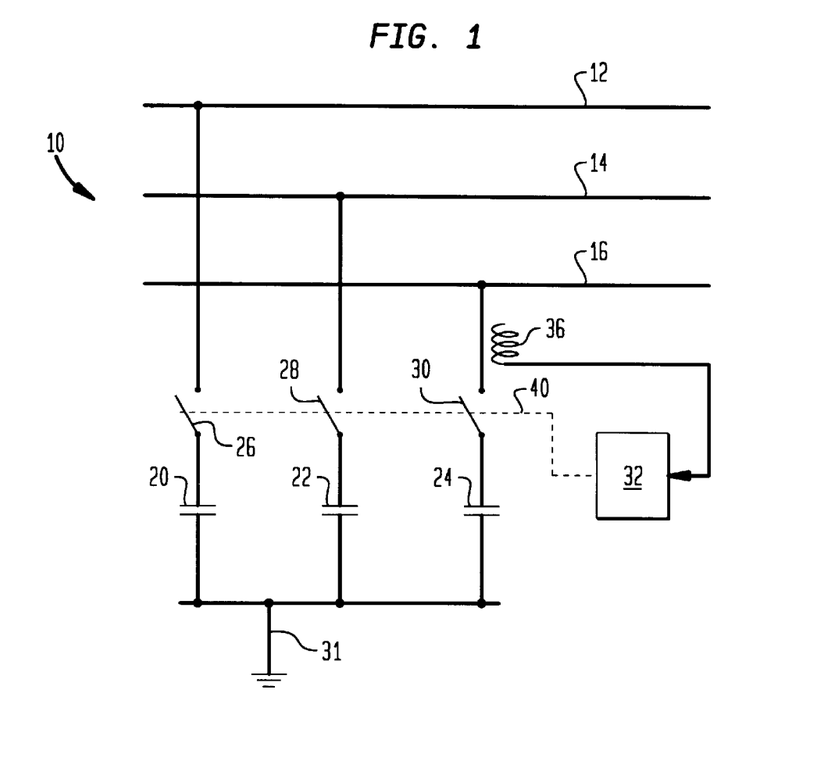
FIG. 1 is a block diagram of a capacitor switcher in a three-phase distribution system in accordance with the preferred embodiment of the present invention.

Referring to FIG. 1, a block diagram of a preferred high voltage, three-phase transmission system is shown. A three phase transmission line 10, comprising phase A line 12, phase B line 14 and phase C line 16, is connected to a capacitor bank comprising three capacitors, 20, 22 and 24 through a switch. Each of these capacitors 20, 22 and 24 is connected to one side of a switch, 26, 28 and 30, respectively. The other side of each capacitor 20, 22 and 24 is grounded, for example, to a substation ground grid 31.

The switches 26, 28 and 30 connect and disconnect each grounded capacitor to a respective transmission line. For example, capacitor 20 is connected and disconnected to phase A line 12 via switch 26, capacitor 22 is connected and disconnected to phase B line 14 via switch 28, and capacitor 24 is connected and disconnected to phase C line 16 via switch 30.

The switches 26, 28 and 30 are controlled by switch controller 32. Switch controller 32 monitors the voltage signal in the phase C transmission line via station potential transformer 36 and controls movement of the capacitor switches 26, 28 and 30. Switch controller 32 has an output or outputs 40 that causes the switches to physically move into a closed position, thereby switching the capacitors into the transmission lines.

Figure 2:
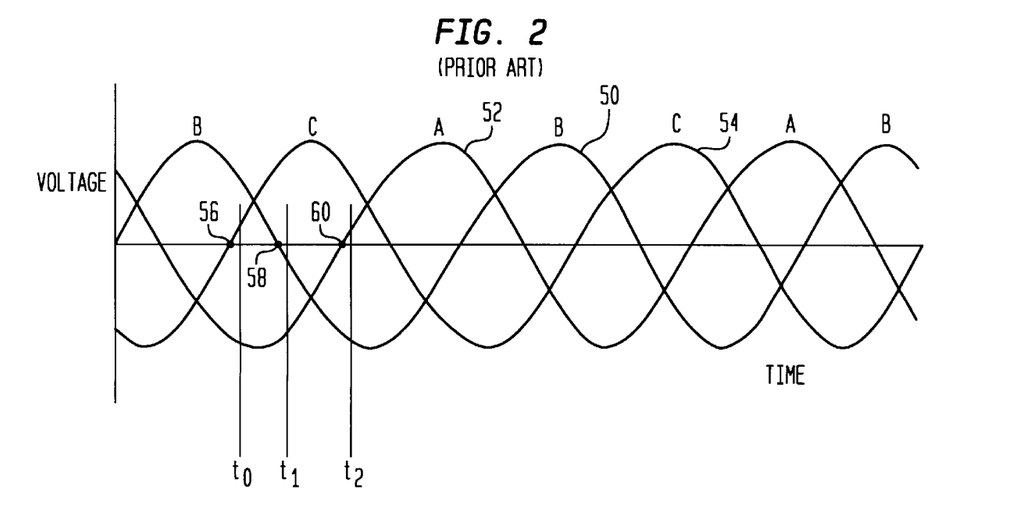
FIG. 2 is a graphical diagram that shows a prior art timing sequence for switching grounded capacitors into a three-phase distribution system.

Turning to FIG. 2, a graphical diagram of the voltage signal waveforms in the three phases of transmission line 10 is shown. For exemplary purposes, a 120 degree phase, 60 hertz, voltage transmission system is shown. More particularly, the voltage signal waveform in the phase B line is shown at 50, the voltage signal waveform of phase A is shown at 52, and the voltage signal waveform of phase C is shown at 54. For exemplary purposes, the voltage signal waveforms for each phase are all AC (alternating current) signals, transmitted at 60 hertz (60 cycles a second), but, as persons skilled in the art will appreciate, any transmission system could be used. Each signal thus crosses zero twice per cycle. Each phase is offset from the other phases by 120 degrees, which produces voltage zeros every 60 degrees.

Accordingly, it is known that each voltage signal will cross zero potential 120 times a second, or once every 8.33 milliseconds (or, for 50 Hertz systems, each voltage signal phase crosses zero 100 times a second, or once every 10 milliseconds). Also, since each phase is offset by 120 degrees, each subsequent voltage zero crossing can be easily predicted and calculated. For example, as shown in FIG. 2, the phase C voltage signal 54 crosses zero potential at reference numeral 56, the phase B voltage signal 52 crosses zero potential at reference numeral 58, 2.78 milliseconds later, and the phase A voltage signal 50 crosses zero potential at reference numeral 60, 5.55 milliseconds after the phase C voltage signal crossed zero at 56.

Thus, by monitoring the voltage waveform signal in the phase C line 16 via station potential transformer 36, switch controller 32 can determine when the voltage signal in that phase crosses zero potential. Furthermore, since the voltage signals of subsequent phases B and A will cross zero potential 2.78 and 5.55 milliseconds later, respectfully, the switch controller can predict when the voltage signals in the other two transmission lines cross zero potential. In fact, all of this information can be determined by simply monitoring the zero crossings of the voltage waveform in any one phase.

It is known to switch the grounded capacitors 20, 22 and 24 into the system at voltage zeros or shortly thereafter to account for pre-striking. For example, as shown in FIG. 2, a known timing system is shown. Phase C switch 30 is set to close at time t0, which is about 1 millisecond after the phase C voltage waveform 54 crosses zero potential, which is indicated at 56. This allows a window of time during which the contacts of phase C switch 30 can pre-strike, which will insert phase C capacitor 24 into phase C line 16 closer to the zero crossing 56 of phase C voltage signal 54.

As is known in the art, by monitoring the voltage signal of one phase, the switch controller 32 can easily determine via a timer, software or the like when to switch the capacitor 24 into the line such that its switch 30 will close about 1 millisecond after the voltage signal in its respective phase crosses zero potential.

Similarly, as is known, phase B switch 28 is targeted to close at time t1, which is about 1 millisecond after the phase B voltage signal 50 crosses zero potential, which is indicated at 58. This also allows a window of time during which the contacts of phase B switch 28 can pre-strike, which will insert phase B capacitor 22 into phase B line 14 closer to the zero crossing 58 of phase B voltage signal 50. As explained above, time t1 occurs about 2.78 milliseconds after time t0 for a 60 Hertz, three phase system (or, for a 50 Hertz, three phase system, it would occur about 3.33 milliseconds after t0).

Likewise, and for the same reasons, phase A switch 26 is set to close at time t2 which is about 1 millisecond after the phase A voltage signal 52 crosses zero potential, which is indicated at 60. Time t2 is about 2.78 milliseconds after time t1. Thus, all three capacitors 20, 22 and 24 are inserted into their respective phases within one half of one cycle (e.g., within 8.33 milliseconds for a 60 Hertz system, or within 10.00 milliseconds for a 50 Hertz system), and preferably at or close to the voltage zero crossings of their respective lines.

In other words, it is known to switch a first phase capacitor into its respective phase when, or shortly after, the voltage signal in its phase crosses zero potential. Then, the next phase capacitor is promptly switched into its respective phase when, or shortly after, the voltage signal in its phase crosses zero potential, and the third phase capacitor is then promptly switched into its respective line when, or shortly after, the voltage signal in its phase crosses zero potential.

As explained above, however, the known timing sequence of FIG. 2 does not address the problem of voltage transients that occur during the closing of the first capacitor switch 30, that may be caused, for example, by ground grid impedance. Such transients will make it more likely that the next two switches 28 and 26 will pre-strike, and, if the transients are large enough, may cause these switches to pre-strike more than 1 millisecond prior to zero crossing of their respective voltage signals. In many instances, the voltage transients caused during the closing of the first capacitor causes the next two switches to pre-strike at the same time the first switch pre-strikes. Pre-striking of the other switches will also compound the voltage transients, which can adversely impact the quality of the voltage signal being transmitted to customers and damage equipment.

Figure 3:
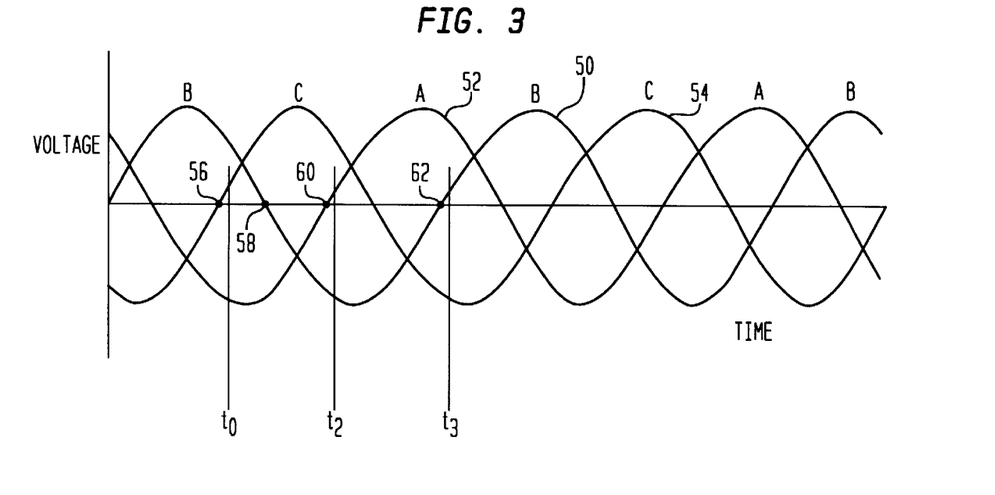
FIG. 3 is a graphical diagram of the timing sequence for switching grounded capacitors into a three-phase distribution system in accordance with the preferred embodiment of the present invention.

Turning to FIG. 3, a unique timing sequence is shown that improves the quality of the overall power signal by minimizing voltage transients during capacitor insertion. Like the sequence shown in FIG. 2, phase C switch 30 is set to close at time t0, which is about 1 millisecond after the phase C voltage waveform 54 crosses zero potential, which is indicated at 56. This allows a window of time during which the contacts of phase C switch 30 can pre-strike, which will insert phase C capacitor 24 into phase C line 16 closer to the zero crossing 56 of phase C voltage signal 54.

As is known in the art, by monitoring the voltage signal carried in at least one phase, the switch controller 32 can easily determine via a timer, software or the like when to switch the capacitor 24 into the line such that its switch 30 will close about 1 millisecond after the voltage zero crossing at 56.

However, unlike the timing sequence shown in FIG. 2, phase B switch is not closed when, or shortly after, the phase B voltage signal 50 crosses zero potential at 58. Instead, this phase B zero crossing is allowed to pass. Phase A switch 26 is then targeted to close at time t2. Although time t2 is about 1 millisecond after the phase A voltage signal 52 crosses zero potential, which is shown at 60, the phase B zero crossing was allowed to pass in the interim between the closing of phase C switch 30 and phase A switch 26.

This delay between the closing of the first phase switch and the next phase switch allows any voltage transients caused during the closure of the first phase switch to dissipate. During this delay, and during the peak of any transients, phase A switch 26 and phase B switch 28 have large gaps between their switch contacts and are thus able to withstand any voltage transients produced during the closing of phase C switch 30. Consequently, phase A switch 26 and phase B switch 28 will not pre-strike since their switch contacts are physically far apart. By the time phase A switch 26 begins to close, any voltage transients caused by the insertion of phase C capacitor 24 have dissipated and are insufficient to cause premature pre-striking during the insertion of phase A capacitor 20.

After phase A switch 26 is closed, the system then waits until the phase B voltage signal 50 crosses zero potential at 62. Thus, there is another interim delay between the phase A switch 26 closing and the phase B switch 28 target closing. More particularly, as shown in FIG. 3, phase B switch 28 is targeted to close at time t3. Time t3 is about 1 millisecond after the phase B voltage signal 50 crosses zero potential, which is shown at 64. However, there was a delay of over ¼ of one cycle after phase A switch 26 was closed before the phase B switch 28 was targeted to close. In other words, instead of closing phase B switch 28 at or shortly after phase B voltage zero crossing 58, the system delayed until the next zero crossing of phase B, as shown in FIG. 3 at 62.

Thus, any voltage transients caused during the insertion of phase A capacitor 20 are allowed to dissipate prior to insertion of phase B capacitor 22. During this delay, phase B switch 28 is open and has not begun to close, and, therefore will not pre-strike since its switch contacts are physically far apart. By the time phase B switch 28 begins to close, any voltage transients caused by the insertion of phase A capacitor 20 have dissipated and are insufficient to cause premature pre-striking during the insertion of phase B capacitor 22.

Consequently, in light of the unique timing sequence disclosed in FIG. 3, all of the capacitors 20, 22 and 24 can be inserted into the system without significantly compounding voltage transients caused by any single capacitor insertion. This minimizes the risk of premature pre-striking of other capacitor switches. This extends the life of equipment and greatly improves the quality of the power signal supplied to the customer.

Figure 4:
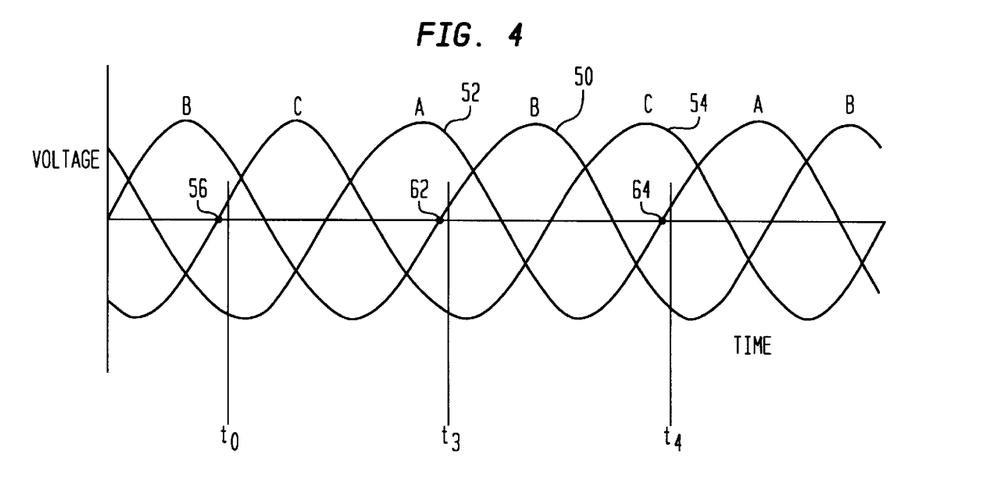
FIG. 4 is a graphical diagram of the timing sequence for switching grounded capacitors into a three-phase distribution system in accordance with an alternative embodiment of the present invention.

Of course, as persons skilled in the art will appreciate, greater delays between capacitor switch-ins can be implemented without deviating from the spirit or scope of the invention. For example, as shown in FIG. 4, phase C switch 30 can be targeted to close at time t0, followed by phase B switch 28 at time t3, followed by phase A switch 26 at time t4. Consequently, there is an interim delay of greater than one-half of one cycle between each switch closure. This interim delay allows any transients caused during a single switch closure to dissipate before the closing of the subsequent switches. Similarly, longer delays of three-fourth of one cycle, a full cycle, one and one-quarter cycle, and the like could also be used. These delays will also minimize voltage transients and pre-striking.

Preferably, the one-quarter of one cycle interim delays (or greater) between capacitor switch-ins, as shown in FIGS. 3 and 4, is achieved by using a set of capacitor switches that are controlled by a single mechanism (gang operated), with the correct timing and delays achieved by staggering the distances between the contacts of each switch. A system having staggered contacts was described in co-pending, commonly assigned U.S. patent application Ser. No. 08/899, 364 to Rostron et al., filed on Jun. 23, 1997, the disclosure of which is herein incorporated by reference.

Figure 5:
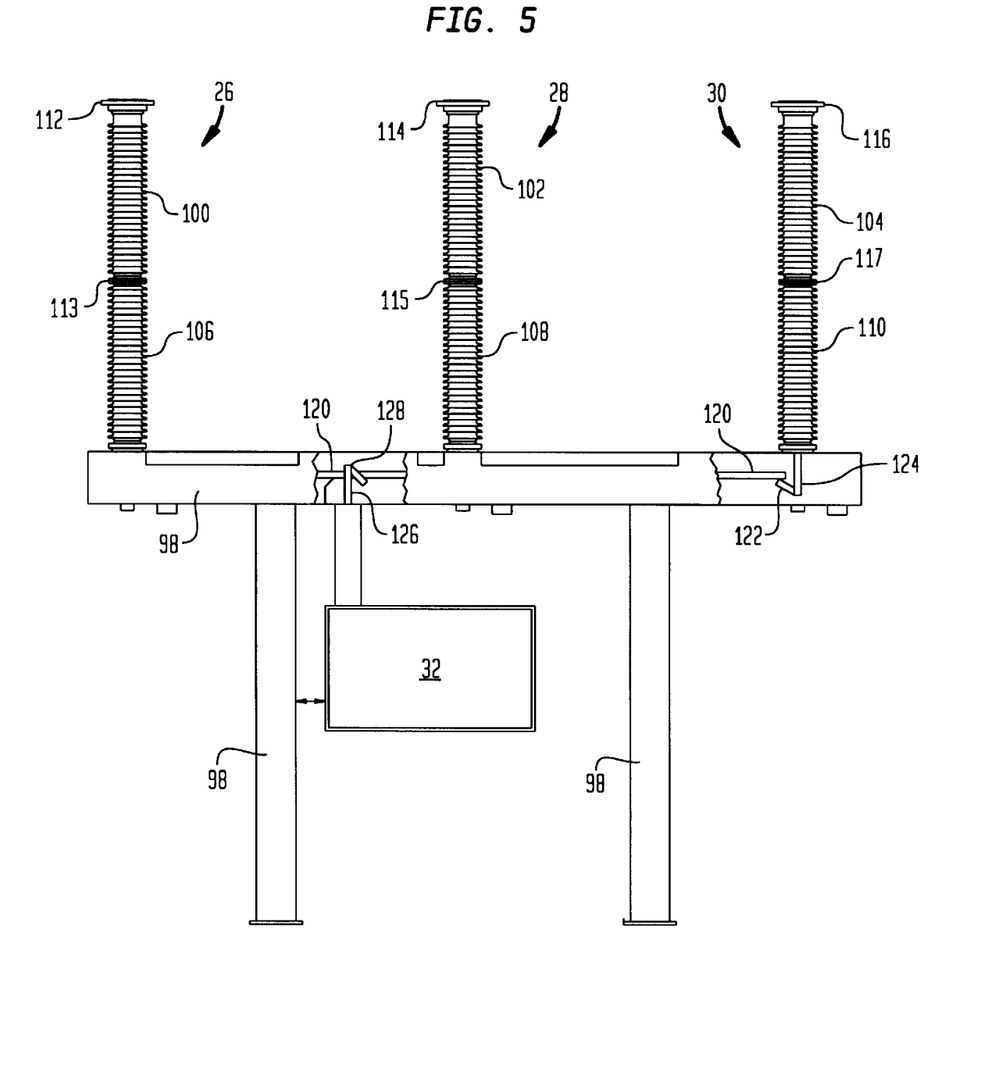
FIG. 5 is a front view of a capacitor switcher in accordance with the preferred embodiment of the present invention, with a partial cutaway view illustrating linkages in accordance with the preferred embodiment of the present invention.
Figure 6:
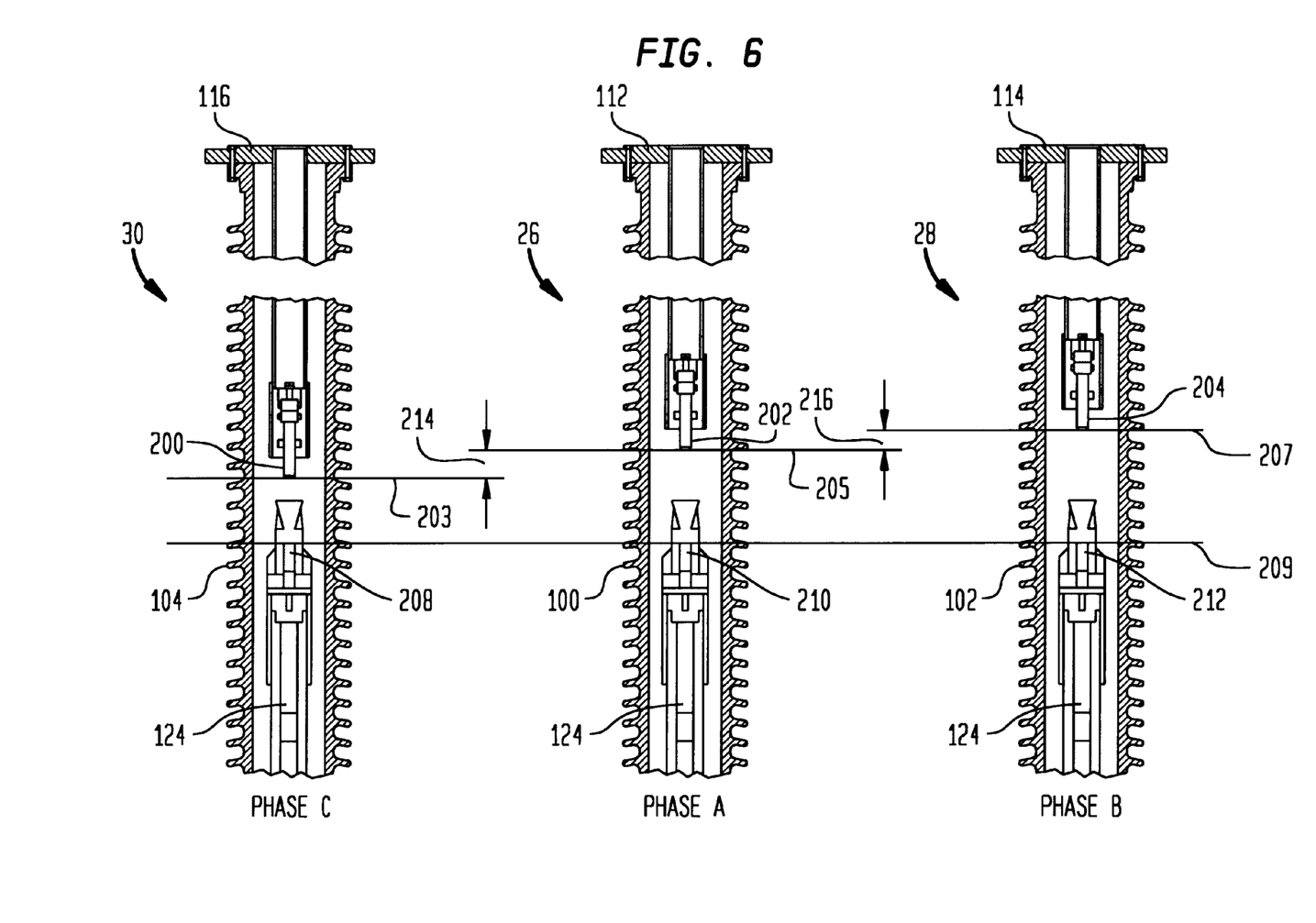
FIG. 6 is a detailed view of the contact structure of a grounded type capacitor switcher in accordance with the preferred embodiment of the present invention.

Specifically, turning to FIG. 5, a front view of preferred capacitor switches 26, 28 and 30 and switch controller 32 is shown. A base assembly 98 supports the capacitor switches 26, 28 and 30 and the switch controller 32. Each capacitor switch has an interrupter part 100, 102 and 104, respectively, and a insulator part 106, 108 and 110, respectively. As shown in FIG. 6, each switch 30, 26 and 28 has a stationary contact 200, 202 and 204, respectively, and a movable contact 208, 210 and 212, respectively (in FIG. 6, for simplicity purposes, phase C is drawn first, followed by phases A and B). These contacts are located within the interrupter part of the switch.

Terminal pads 116, 112 and 114 are located towards the ends of each switch, and are electrically connected to the stationary contacts 200, 202 and 204, respectively. Terminal pads 117, 113 and 115 are electrically connected to the movable contacts 208, 210 and 212, respectively. These terminal pads are connected, in turn, to an associated capacitor and transmission line (e.g., terminal pad 116 of switch 30 is connected to phase C transmission line 16, and terminal pad 117 is connected to capacitor bank 24; terminal pads 112 and 113 are connected to phase A transmission line 12 and capacitor bank 20, respectively; and terminal pads 114 and 115 are connected to phase B transmission line 14 and capacitor 22, respectively). Consequently, when the movable contacts contact their respective stationary contacts, a conductive pathway is formed between the terminal pads of each switch, thereby connecting the transmission lines to their associated capacitors for each phase.

The base assembly 98 contains a horizontal pull rod 120. Pull rod 120 is connected via a bell crank 122 to vertical pull rods 124 within each insulator and interrupter. Pull rod 120 moves horizontally, and this horizontal movement is transferred to vertical movement of pull rods 124 via bell cranks 122 (although not shown, phase A and B switches have similar pull rods 124 and bell cranks 122). Movement of the horizontal pull rod 120 is controlled by actuator rod 126 that extends vertically from the switch controller 32. Another bell crank 128 converts the vertical movement of actuator rod 126 into horizontal movement of pull rod 120, and, in turn, bell cranks 122 convert this horizontal movement of pull rod 120 back into vertical movement of pull rods 124.

Actuator rod 126 is controlled in turn by switch controller 32. Switch controller 32 monitors the voltage signal in phase C line 16 via transformer 36, and keeps track of voltage zero crossings (of course, phase C was selected for exemplary purposes only, and switch controller 32 could monitor any phase or multiple phases). Switch controller 32 then determines when it should insert capacitor 24 into the line. Such switch controllers are well known in the art, and, for sake of brevity are not discussed in detail here. When the switch controller determines that capacitor 24 should be inserted, it moves actuator rod 126 by releasing a spring, moving a solenoid, activating hydraulics, or the like, as is known in the art.

Turning now to FIG. 6, the preferred structure of switches 30, 26 and 28 having staggered contacts is illustrated. Each switch comprises a stationary contact and a movable contact. Specifically, phase C switch 30 has a stationary contact 200 and a movable contact 208; phase A switch 26 has a stationary contact 202 and a movable contact 210; and phase B switch 28 has a stationary contact 204 and a movable contact 212. Each movable contact 208, 210 and 212 is connected to a pull rod 124, which, in turn, are preferably all controlled by a single force, such as a spring, solenoid, hydraulics, or the like in the switch controller 32 (as is known in the art). More particularly, when a force is applied to actuator rod 126, actuator rod 126 forces each pull rod 124 upwards at substantially the same time and at substantially the same velocity. This, in turn, moves each movable contact 208, 210 and 212 towards its respective stationary contact 200, 202 and 204 at substantially the same time and at substantially the same velocity (for example, at four meters per second for a 145 kV device with one contact per phase). When the movable contact makes contact with its respective stationary contact, a circuit path is completed between the respective terminal pads, i.e., 116 and 117, 112 and 113, and 114 and 115.

To achieve the desired timing of the closure of switches 30, 26 and 28 as shown in FIG. 3, stationary contacts 200, 202 and 204 are physically staggered at different distances from their respective movable contacts 208, 210 and 212. More particularly, the tip of each movable contact is located at a first plane 209, the tip of stationary contact 200 is located at a second plane 203, the tip of stationary contact 202 is located at a third plane 205, and the tip of stationary contact 204 is located at a fourth plane 207. Plane 203 is staggered at a distance 214 from plane 205, and plane 205 is staggered at a distance 216 from plane 207.

Since the movable contacts are all actuated by pull rod 120 (which, in turn, is actuated by actuator rod 126), each movable contact moves at substantially the same time, with substantially the same velocity, towards its respective stationary contact as each other movable contact. Consequently, when the pull rod 120 is actuated, movable contact 208 will first contact stationary contact 200, thereby connecting its respective capacitor bank to its respective phase C power line. Then, movable contact 210 will contact its respective stationary contact 202, thereby connecting its respective capacitor bank to its respective phase A power line. Finally, movable contact 212 will contact its respective stationary contact 204, thereby connecting its respective capacitor bank to its respective phase B power line.

Preferably, and as described above, stationary contact 202 is arranged at a distance from movable contact 210 such that they are targeted to close about 5.55 milliseconds after phase C contacts 208 and 200 close. Similarly, stationary contact 204 is arranged at a distance from movable contact 212 such that they are targeted to close about 5.55 milliseconds after phase A contacts 210 and 202 close.

Since the velocity of the movable contacts is known, or can be easily measured, and since the preferred timing of closure of the switches is known (provided the cycle and phase of the system is known), the required distance between a movable contact and its stationary contact can be easily calculated because this distance is a function of velocity and time. Each stationary contact should then be located at this calculated distance from its respective stationary contact to achieve the desired timing of the switches. Preferably, after the stationary contacts are located, the stationary contacts or the movable contacts are arranged so that their locations can be further adjusted. This can be easily accomplished, for example, by having each pull rod 124 comprised of a threaded male member and a threaded female member. One of the members could therefore be easily adjusted in length by turning it. Alternatively, one of the contacts could be adjustable in a similar fashion. This will allow for minor corrections in the distance between the movable contacts and stationary contacts to be made to account for fluctuations, such as wear and routine maintenance and calibration.

As persons skilled in the art will appreciate, the movable contacts of each switch can be alternatively located at staggered distances from their respective stationary contacts (which can all be placed at a single plane). Such alternate arrangements do not deviate from the spirit or scope of the present invention.

In addition, as persons skilled in the art will appreciate, a switch controller that controls each capacitor switch 26, 28 and 30 separately can be implemented to achieve the desired delay and synchronization between switchings, without deviating from the spirit or scope of the present invention. Capacitor switches that individually control the closing of each switch are known in the art. Such switches, for example, can use three individual pull rods each with an actuator releasing a spring, moving a solenoid, activating hydraulics, or the like (not illustrated) instead of the single pull rod 120 shown in FIG. 4. Each pull rod then controls an individual capacitor switch, and the switch controller releases each pull rod individually. Such controllers typically monitor the voltage signal carried in one line, and then use hardware and software to implement the timing sequence shown in FIG. 2.

More particularly, for a 60 Hertz, three phase system, such switch controllers may monitor the voltage signal carried in the first phase. The controller then targets and closes the first capacitor switch such that it will close at the voltage zero crossing, or about 1 millisecond after the voltage signal crosses zero (as shown, for example, in the timing sequence of FIG. 2). The controller then delays 2.78 milliseconds and releases the second capacitor switch, and delays another 2.78 milliseconds and releases the last capacitor switch.

In order to achieve the unique timing sequence of the present invention as shown in FIG. 3, such a switch controller would still target and close the first capacitor switch such that it closes at or 1 millisecond after the voltage signal carried in that line crosses zero potential. The voltage signal in the next phase would then cross zero potential, but the switch controller would not actuate the switch. Instead, the switch controller would delay and wait for the third phase voltage signal to cross zero potential, and then target the third phase voltage signal to close at or about 1 millisecond after the voltage signal in this phase crosses zero potential (which, for 60 Hertz, three phase systems, would be about 5.55 milliseconds after the first phase voltage signal crossed zero potential). Then, the switch controller would target the second phase switch to close about 1 millisecond after the voltage signal in that phase crosses zero potential (which, again, would be about 5.55 milliseconds after the third phase switch was targeted to close). As explained above, these additional delays allow any voltage transients to dissipate prior to the closing of the next switch.

While one embodiment of a capacitor switcher and several modifications thereof have been described in detail herein, various other changes and modifications may be made without departing from the scope of the present invention.

What is claimed is:

1. A capacitor switching device that switches grounded capacitors into a power line having at least three phases, wherein each phase of said line carries an AC voltage that cycles its polarity; comprising:

a first switch associated with a first grounded capacitor;

a second switch associated with a second grounded capacitor;

a third switch associated with a third grounded capacitor;

a switch controller;

said controller switches said first grounded capacitor into a first phase of said power line substantially when said voltage in said first phase crosses zero potential;

said controller switches said second grounded capacitor into a second phase of said power line at least one-quarter of one cycle after said first grounded capacitor was switched into said first phase and substantially when said voltage in said second phase crosses zero potential; and said switch controller switches said third grounded capacitor into a third phase of said power line at least one-quarter of one cycle after said second grounded capacitor was switched into said first phase and substantially when said voltage in said third phase crosses zero potential.

2. The device of claim 1 wherein said switch controller switches said second grounded capacitor into said second phase of said power line substantially 120 degrees after said first grounded capacitor was switched into said first phase, and said switch controller switches said third grounded capacitor into said third phase of said power line substantially 120 degrees after said second grounded capacitor was switched into said second phase.

3. The device of claim 1 wherein said controller targets the closing of said first switch such that it closes within 2 milliseconds after the voltage in said first phase crosses zero potential.

4. The device of claim 3 wherein said controller targets the closing of said second switch such that it closes within 2 milliseconds after the voltage in said second phase crosses zero potential, and said controller targets the closing of said third switch such that it closes within 2 milliseconds after the voltage in said third phase crosses zero potential.

5. The device of claim 1 wherein said controller targets the closing of said first, second and third switches such that they each close shortly after the voltage signal in each respective phase crosses zero potential.

6. The device of claim 1 wherein said power line is a three phase power line, and each phase of said line is separated by 120 degrees and carries an AC voltage that cycles at 60 cycles per second.

7. The device of claim 6 wherein said switch controller targets the closing of said first, second and third switch to each close within 2 milliseconds after the voltage in each respective phase crosses zero potential.

8. The device of claim 7 wherein said switch controller targets the closing of said second switch to close about 120 degrees after said first switch was targeted to close.

9. The device of claim 8 wherein said controller targets the closing of said third switch to close about 120 degrees after the second switch was targeted to close.

10. The device of claim 1 wherein said power line is a three phase power line, and each phase of said line is separated by 120 degrees and carries an AC voltage that cycles at 50 cycles per second.

11. The device of claim 10 wherein said switch controller targets the closing of said first, second and third switch to each close within 2 milliseconds after the voltage in each respective phase crosses zero potential.

12. The device of claim 11 wherein said switch controller targets the closing of said second switch to close about 120 degrees after said first switch was targeted to close.

13. The device of claim 12 wherein said controller targets the closing of said third switch to close about 120 degrees after the second switch was targeted to close.

14. The device of claim 1 wherein:
each switch has a movable contact and a stationary contact, and each switch has an open position, a closed position wherein the movable contact is in contact with its respective stationary contact, and a transition position wherein the movable contact moves towards its respective stationary contact;
the stationary contact of the first switch positioned at a first distance from its respective movable contact when the first switch is in an the open position;
the stationary contact of the second switch positioned at a second distance greater than the first distance from its respective movable contact when the second switch is in an the open position;
the stationary contact of the third switch positioned at a third distance greater than the second distance from its respective movable contact when the third switch is in an the open position;
said controller releases each switch from said open position into said transition position at substantially the same time;
during said transition position, each movable contact moves towards its respective stationary contact at substantially the same velocity as the other movable contacts;
said controller targets the closing of said first switch such that it closes shortly after the voltage signal in the first phase line crosses zero potential;
said second distance is arranged such that the movable contact of said second switch contacts its respective stationary contact at least one-quarter of one cycle after the first switch closes and shortly after the voltage signal in the second phase line crosses zero potential.

15. The device of claim 14 wherein said third distance is arranged such that the movable contact of said third switch contacts its respective stationary contact at least one-quarter of one cycle after the second switch closes, and shortly after the voltage signal in the third phase line crosses zero potential.

16. The device of claim 14 wherein the second distance is arranged such that the movable contact of said second switch contacts its respective stationary contact substantially 120 degrees after the first switch was targeted to close.

17. The device of claim 16 wherein the third distance is arranged such that the movable contact of said third switch contacts its respective stationary contact substantially 120 degrees after the second switch was targeted to close.

18. A multi-phase capacitor switcher that switches grounded capacitors into a multi-phase AC power line, comprising:
a first grounded capacitor;
a second grounded capacitor;
a third grounded capacitor;
a controller that monitors the voltage in at least one phase of the power line;
a first capacitor switch having a movable contact and a stationary contact, said first switch having an open position wherein said stationary contact is positioned at a first distance from said movable contact, a closed position wherein said movable contact is in contact with said stationary contact, and a transition position wherein the movable contact moves towards the stationary contact at a predetermined velocity;
said first capacitor switch coupling said first capacitor to the first phase of said multi-phase line when in said closed position;
a second capacitor switch having a movable contact and a stationary contact, said second switch having an open position wherein said stationary contact is positioned at a second distance greater than the first distance from its respective movable contact, a closed position wherein said movable contact is in contact with said stationary contact, and a transition position wherein said movable contact moves toward said stationary contact at a predetermined velocity;
said second capacitor switch coupling said second capacitor to the second phase of said multi-phase line when in said closed position;
a third capacitor switch having a movable contact and a stationary contact, said third switch having an open position wherein said stationary contact is positioned at a third distance greater than the second distance from its respective movable contact, a closed position wherein said movable contact is in contact with said stationary contact, and a transition position wherein said movable contact moves toward said stationary contact at a predetermined velocity;
said third capacitor switch coupling said third capacitor to the third phase of said multi-phase line when in said closed position;
said controller coupled to said first, second and third capacitor switches;
said first, second and third capacitor switches gang controlled so that they transition from the open position to the transition position at substantially the same time;
said controller targeting the closure of said first switch shortly after said voltage signal crosses voltage zero;
said second distance arranged so that the second switch closes more than one-quarter of one AC cycle after said first switch closes; and
said third distance arranged so that the third switch closes more than one-quarter of one AC cycle after said second switch closes.

19. The device of claim 18 wherein:
said controller targets the closure of said first switch so that it closes within 2 milliseconds after said voltage crosses voltage zero;
said second distance is arranged so that the second switch closes substantially 120 degrees after said first switch was targeted to close; and
said third distance is arranged so that the third switch closes substantially 120 degrees after said second switch was targeted to close.

20. The device of claim 19 wherein said multi-phase power line is a three phase, 60 Hertz line.

21. The device of claim 19 wherein said multi-phase power line is a three phase, 50 Hertz line.

22. A transient reducing capacitor switching device that switches grounded capacitors into a power line having at least three phases, wherein said at least three phases each transmits AC voltage, comprising:

a first switch coupled to a first grounded capacitor for switching said first capacitor into a first phase;

a second switch coupled to a second grounded capacitor for switching said second capacitor into a second phase;

a third switch coupled to a third grounded capacitor for switching said third capacitor into a third phase;

a switch controller that monitors the voltage in at least one phase;

said controller switching said first grounded capacitor into said first phase substantially when said voltage signal in said first phase crosses zero potential;

said controller switching said second grounded capacitor into said second phase at least one-fourth of one AC cycle after said first grounded capacitor was switched into said first phase, and substantially when said voltage signal in said second phase crosses zero potential;

said controller switching said third grounded capacitor into said second phase at least one-fourth of one AC cycle after said second grounded capacitor was switched into said second phase, and substantially when said voltage signal in said third phase crosses zero potential.

23. The device of claim 22 wherein said controller targets the closing of said first switch within 2 milliseconds after the voltage signal in said first phase crosses zero potential.

24. A method of reducing transients during switching of capacitors into multi-phase power lines transmitting AC voltage, comprising the steps of:

monitoring the voltage in at least one phase of said power line;

switching a first capacitor into a first phase of said power line substantially when the voltage in said first phase is at zero potential; and delaying until after the voltage in a third phase of said power line crosses zero potential and then switching a second capacitor into a second phase of said power line substantially when the voltage in said second phase is at zero potential.

25. The method of claim 24 further comprising the steps of:

delaying until after the voltage in said first phase of said power line crosses zero potential and then switching a third capacitor into said third phase of said power line substantially when the voltage in said third phase is at zero potential.

26. The method of claim 25 wherein said first, second and third capacitors are switched into their respective first, second and third phases within 2 milliseconds after the respective voltages cross zero potential in each respective phase.

27. A method of switching grounded capacitors into a three-phase voltage transmission line, comprising the steps of:

switching a first grounded capacitor into the first phase of said line;

delaying to let any transients caused during the first switching to diminish;

switching a second grounded capacitor into the second phase of said line;

delaying to let any transients caused during the second switching to diminish; and switching a third grounded capacitor into the third phase of said line.

* * * * *